June 27, 1950  G. A. TINNERMAN  2,512,982
FASTENING DEVICE FOR ELECTRIC WIRES
Filed Jan. 11, 1945  2 Sheets-Sheet 1
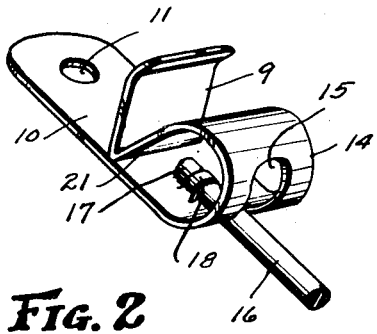
FIG. 2
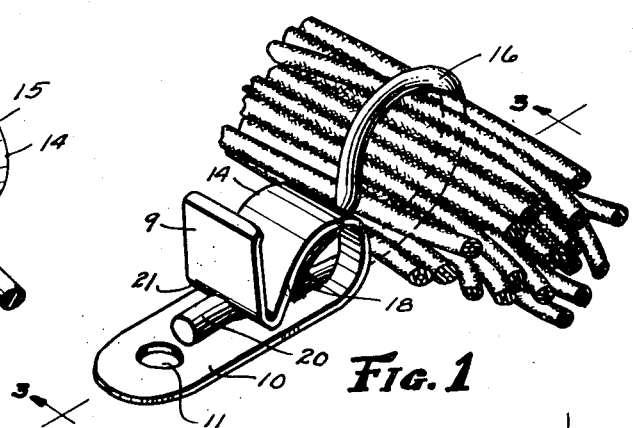
FIG. 1
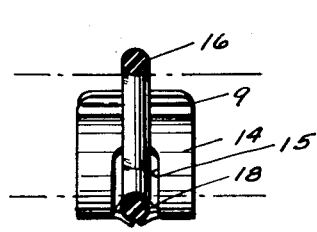
FIG. 4
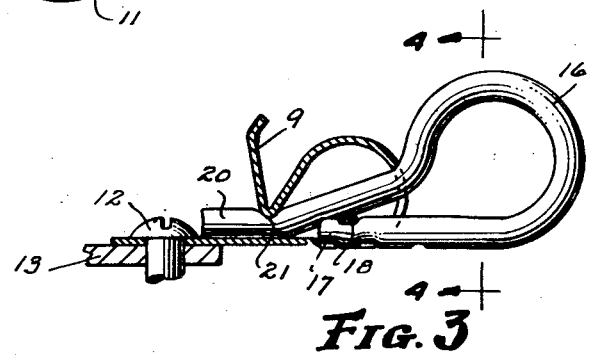
FIG. 3
FIG. 5
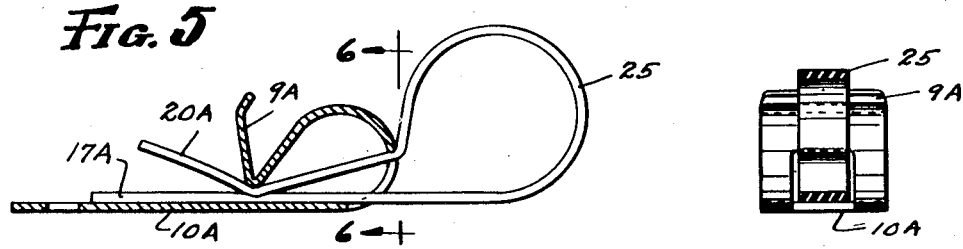
FIG. 6
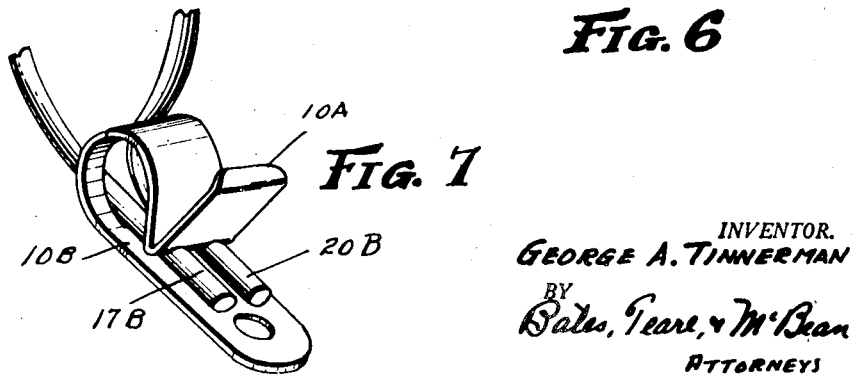
FIG. 7
INVENTOR.
GEORGE A. TINNERMAN
BY
Bates, Teare, & McBean
ATTORNEYS June 27, 1950            G. A. TINNERMAN            2,512,982

FASTENING DEVICE FOR ELECTRIC WIRES

Filed Jan. 11, 1945                             2 Sheets-Sheet 2

INVENTOR.
GEORGE A. TINNERMAN
BY
Bates, Teare, & McBean
ATTORNEYS

Patented June 27, 1950

2,512,982

UNITED STATES PATENT OFFICE 2,512,982

FASTENING DEVICE FOR ELECTRIC WIRES

George A. Tinnerman, Cleveland, Ohio, assignor to Tinnerman Products Inc., Cleveland, Ohio, a corporation of Ohio Application January 11, 1945, Serial No. 572,311

1 Claim. (Cl. 24—73)

This invention relates to a clamp adapted to surround a longitudinally extending body, such for example as an assembly of wires and provide means for the attachment thereof to a support. The invention finds particular applicability in the assembly of wires in an aircraft structure, although it is equally suitable for similar use wherever a bundle of wires is to be supported in assembled relationship.

An object of the invention is to provide a clamp which may be closed upon a group of wires and which operates to hold the wires in compacted form preliminary to the attachment thereof to a support, whereby the wires may be effectively assembled into a longitudinally extending bundle for subsequent attachment of the clamp to the support.

An additional object of the invention is to so make the clamp as to effect a tight fitting engagement around the wires to be supported without damaging the insulation or covering for the wires. Additionally, the invention contemplates a clamp construction wherein the size of the bundle to be clamped is relatively unlimited in that the loop portion of the clamp which embraces the wire is adjustable for any size of bundle.

An additional object is to provide a clamp wherein the loop portion thereof is automatically locked by the spring tension inherent in the loop supporting structure and embodies a part of the clamp assembly.

Figure 8:
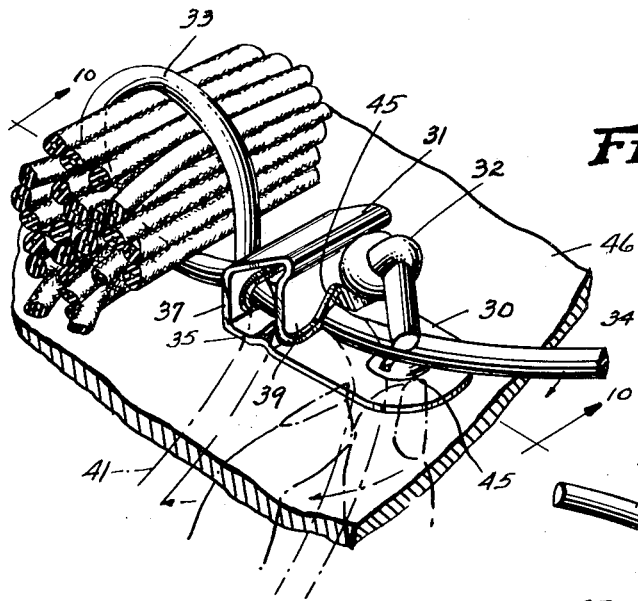
Figure 9:
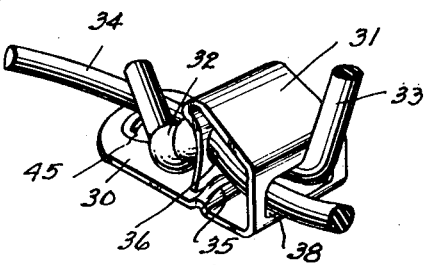
Figure 10:
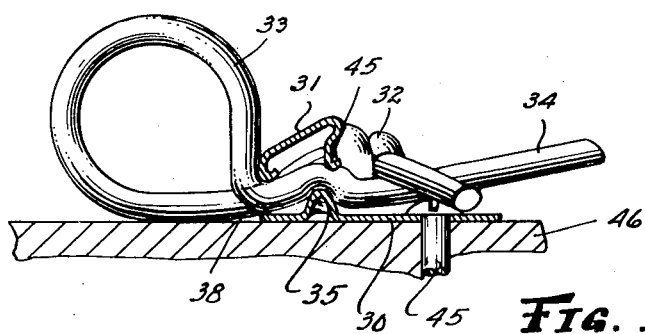
Figure 11:
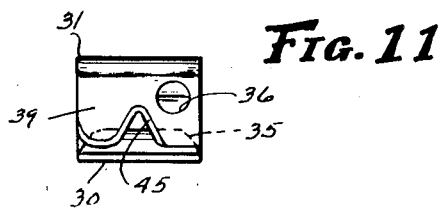

Referring now to the drawings, Fig. 1 is a perspective view of a clamp embodying the present invention and utilized for holding a bundle of wires in assembled relationship; Fig. 2 is a perspective view of the clamp showing one end of the loop strip fastened to the clamp body; Fig. 3 is a section taken on a plane indicated by the line 3—3 in Fig. 1; Fig. 4 is a section taken on a plane indicated by the line 4—4 in Fig. 3; Fig. 5 is a side view of a modified form of construction; Fig. 6 is a section taken on a plane indicated by the line 6—6 in Fig. 5; Figs. 7 and 8 are perspective views showing modified forms of construction; Fig. 9 is a perspective view of the fastener body structure of Fig. 8; Fig. 10 is a section taken on a plane indicated by the line 10—10 in Fig. 8, and Fig. 11 is an end view of the fastener body of Fig. 8.

As shown in Figs. 1 to 7, the clamp has a body structure and a loop structure, with the body structure being formed to hold the loop frictionally in clamping engagement about a bundle of wires. For this purpose the body structure comprises a strip of metal having spring-like characteristics that is reversely bent intermediate its end to provide an arm 10 which has an aperture 11 for receiving a screw or the like 12 for attaching it to a support indicated at 13. The intermediately bent portion of the body structure is indicated at 14 as comprising a relatively wide loop which has a slot 15 extending longitudinally thereof and adapted to receive the ends of a flexible strip 16 which comprises the loop structure that is fitted around the bundle of wires or other object to be supported. In the illustration of Figs. 1 to 4, inclusive, one end 17 of the loop strip is rigidly fastened to the arm 10, preferably by crimping a portion 18 of the arm around the strip, while the other end, after being passed around the bundle of wires is inserted through the slot 15, and then underneath the spring arm 9.

To assure the retention of the loop 20, the arm 9 extends inwardly toward the arm 10 from the intermediate portion 14 and then abruptly outwardly, thereby forming a blunt edged ridge 21 that is adapted to engage the end 20 of the loop and to exert sufficient pressure thereagainst, by virtue of the inherent spring tension in the arm 9, to hold the loop in assembled relationship about a bundle of wires or other articles to be supported.

By making the arm 9 in a substantial V-shape, the free end portion provides a finger grip part by means of which the arm may be lifted to insert the end of the flexible strip therebeneath. It is to be understood that the free end of the strip will be pulled tightly about a bundle of wires, and that when the arm 9 is released, the force exerted by the spring tension thereof will effectively clamp the strip against the arm 10.

The loop strip shown in Figs. 1 to 4 is preferably made of rubber-like material having a slight degree of elasticity and having a cross section which is relatively round in shape. In the modification of Figs. 5 and 6, however, the loop is shown as comprising a flat strip 25, rectangular in shape, and in this modification the end 17A need not be rigidly fastened to the body structure but instead may be passed beneath the end 20A, whereby both ends of the strip are fractionally clamped by the arm 9A against the arm 10 A. In this way, the length of strip to be used for the loop portion may be cut in the desired length to suit the size of the bundle of wires or other object to be supported at the time of making the assembly.

The modification of Fig. 7 may utilize a strip that is round in cross section and is similar to that illustrated in Figs. 1 to 4, inclusive, but in this case the ends 17B and 20B are clamped frictionally in side by side relationship against the arm 10B by means of the spring tension in the arm 10A. In this type of construction, as in the modification of Fig. 5, the looped material may be cut from a coil to the size desired at the time of use.

In the modification of Figs. 8 to 11, the loop strip may be the same as that shown in Fig. 1, but the means for holding the loop in position upon the metallic retaining part is somewhat different in construction. The retaining part has a body 30 which is bent intermediately to provide a spring arm 31 which operates to anchor one end 32 of the loop strip 33, and to hold the other end 34 by frictional engagement through spring tension which presses the flexible material against a transversely extending rib 35 on the body 30.

The arm 31 is substantially a U-shaped member having one end thereof integral with the body 30 and having the other end free to move with reference to the body. The free end of the spring arm 31 has an aperture 36 therein through which the end 32 of the loop may be passed and then knotted as shown in Fig. 8. The portion 37 of the spring arm 31 has a slot 38 for receiving both ends of the loop and the portion 39 of the arm has a notch beneath which the free end of the looped strip may be pulled after the loop has been passed around the bundle of wires.

To use the assembly of Fig. 8, one end of the loop is anchored to the metallic structure by tying a knot therein after the end has been passed through the slot 38 and the aperture 36. Then the flexible strip is passed around the bundle of wires, the free end is threaded through the slot 38 and then out through the open arm of the spring arm 31, as shown by the broken line 41 in Fig. 8. The free end of the strip is then swung inwardly between the rib 35 and the free end of the part 39 until it enters the notched portion 45. The notch is made sufficiently small so that the arm 31 will exert constant spring tension against the flexible strip, thereby imparting a compressive force against it sufficient to hold it securely in position. By utilizing the rib 35 the strip is forced to assume a tortuous position and is thereby firmly held by friction. The construction enables the free end of the flexible strip to be pulled tightly about the bundle, and yet enables it to be readily removed from beneath the arm 31 to permit the addition or removal of a wire from the bundle, and thereafter enables the reassembly to be made without disengaging the fastening member 45 from the supporting structure 46.

An advantage of a clamp made in accordance with the present invention is the fact that the body structure embodies a one-piece element that may be stamped and formed from strip stock, and that the loop may be readily furnished in ample size to cover a wide range of sizes of articles to be held thereby. The clamping action upon the loop forming strip is effected by the spring tension of the body structure, and where desired, one end of the strip forming the loop may be held in place against the other strip by the compressive action exerted by the spring arm of the body structure, or if desired, one end of the strip may be anchored to the body structure and the other end may be clamped independently of the anchored end, thereby assisting in retaining the object or objects to be supported in assembled relationship, while permitting the free end of the loop to be removed for insertion of another article and to be subsequently clamped in an expeditious manner.

Reference is made to my divisional application Serial No. 146,120, filed February 24, 1950, for claims relating to the structure illustrated in Figs. 1 to 7 inclusive.

I claim:

A fastening device comprising a flexible loop arranged to be passed around a bundle of wires or other article to be supported, and a clamping structure consisting of a one-piece sheet metal strip having a relatively long flat arm adapted to be secured to a support and a shorter spring arm connected with the longer arm by a return bend and disposed when moved outwardly to react toward an intermediate region of the longer arm, the loop being anchored at one end to a portion of the clamping structure back of the return bend and thence passing outwardly through an opening in the return bend, the free end of said spring arm operating to hold the other end of the loop by spring tension after it has been passed inwardly through the return bend, said structure having an upstanding rib extending transversely thereof and disposed adjacent the clamping edge of the spring arm, said rib operating as an abutment against which the free portion of the loop may be deformed by the action of the arm.

GEORGE A. TINNERMAN.

REFERENCES CITED

The following references are of record in the file of this patent:

UNITED STATES PATENTS

| Number | Name | Date |
|---|---|---|
| 20,916 | Schrage | July 13, 1858 |
| 827,640 | Jessup | July 31, 1906 |
| 1,163,372 | Schade | Dec. 7, 1915 |
| 1,548,481 | Page | Aug. 4, 1925 |
| 1,564,761 | Daiker | Dec. 8, 1925 |
| 1,635,256 | Carter | July 12, 1927 |
| 1,654,756 | Ryan | Jan. 3, 1928 |
| 1,725,748 | Alexander | Aug. 27, 1929 |
| 1,804,775 | Hull et al. | May 12, 1931 |
| 2,004,231 | Wasson | June 11, 1935 |
| 2,147,160 | Hagist et al. | Feb. 14, 1939 |
| 2,188,534 | Durney | Jan. 30, 1940 |
| 2,209,318 | Caldwell | July 30, 1940 |
| 2,345,279 | Morehouse | Mar. 28, 1944 |